United States Patent
Ando

(10) Patent No.: US 6,199,020 B1
(45) Date of Patent: Mar. 6, 2001

(54) EXTERNAL FORCE MEASURING APPARATUS

(75) Inventor: Masaaki Ando, Otsu (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/104,582

(22) Filed: Jun. 25, 1998

(30) Foreign Application Priority Data

Jun. 27, 1997 (JP) .................................................. 9-187399

(51) Int. Cl.$^7$ .................................. G01L 1/00; G01L 3/00
(52) U.S. Cl. .......................... 702/41; 702/141; 702/151; 702/44; 73/862.08; 73/862.192; 73/862.381; 73/862.42; 73/862.46; 73/488; 324/162
(58) Field of Search .................................. 702/44, 41, 33, 702/141, 151; 73/379.01, 379.03, 379.06, 379.07, 862.08, 862.621, 862.192, 862.05, 862.61, 862.195, 862.381, 862.42, 862.46, 488; 324/162

(56) References Cited

U.S. PATENT DOCUMENTS

| | | | |
|---|---|---|---|
| 4,884,223 | * 11/1989 | Ingle et al. | 702/41 |
| 4,891,764 | * 1/1990 | McIntosh | 364/508 |
| 4,907,168 | * 3/1990 | Boggs | 702/41 |
| 5,027,303 | * 6/1991 | Witte | 702/44 |
| 5,062,062 | * 10/1991 | Nishibe et al. | 702/41 |

FOREIGN PATENT DOCUMENTS

| | | |
|---|---|---|
| 3188317 | 8/1991 | (JP) . |
| 4269622 | 9/1992 | (JP) . |
| 571964 | 3/1993 | (JP) . |
| 7324941 | 12/1995 | (JP) . |

* cited by examiner

*Primary Examiner*—Marc S. Hoff
*Assistant Examiner*—Hien Vo
(74) *Attorney, Agent, or Firm*—Ostrolenk, Faber, Gerb & Soffen, LLP

(57) ABSTRACT

In an external measuring apparatus, a past zero signal value V0 is first read out. A subtracted value obtained by subtracting the zero signal value V0 from a read signal value Vin from an angular velocity detector is compared with a preset first threshold value ΔV1. If no angular velocity is being applied, then the read signal value Vin is updated and set to the zero signal value V0 in which a drift component is canceled. In addition, the subtracted value obtained by subtracting the zero signal value V0 from the read signal value Vin is further compared with a second threshold value ΔV2 so as to perform the zero adjustment of the subtracted value. This makes it possible to eliminate the drift component and the random noise component from the detection signal, enabling accurate angular velocity to be obtained.

8 Claims, 3 Drawing Sheets

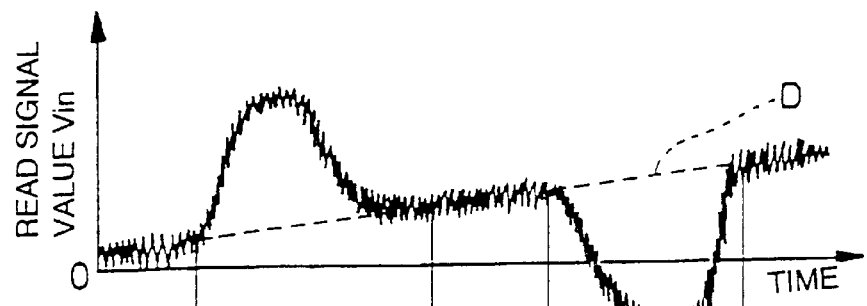
FIG. 3A
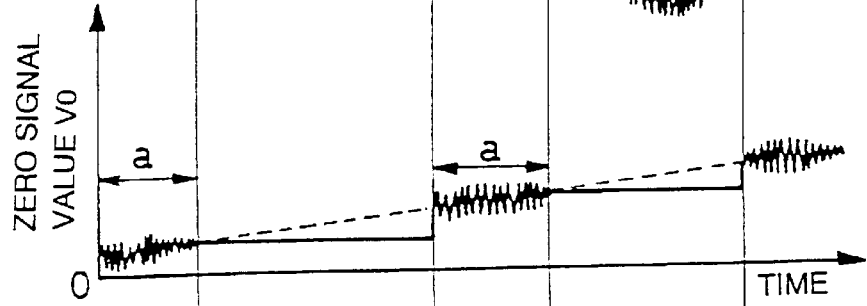
FIG. 3B
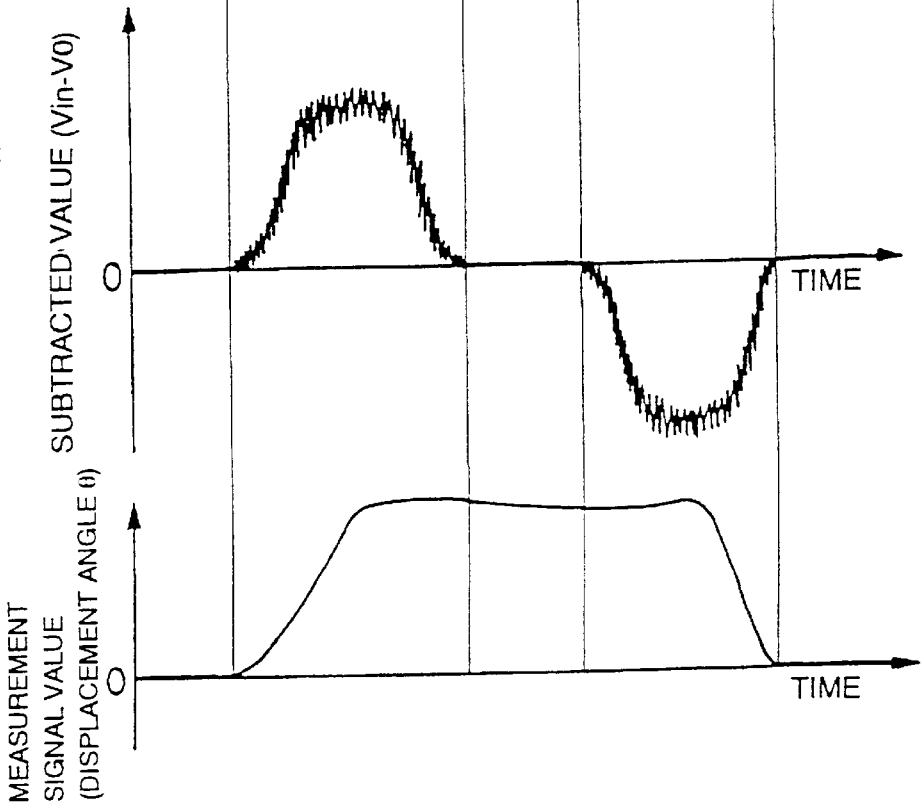
FIG. 3C
FIG. 3D

EXTERNAL FORCE MEASURING APPARATUS

BACKGROUND OF THE INVENTION

1. Field of the Invention

The present invention relates to an external force measuring apparatus which receives signals output from an external force detecting means constituted by, for example, an accelerator sensor and an angular velocity sensor, eliminates components such as random noises and drift noises contained in the signals and thereafter integrates and outputs the signals.

2. Description of the Related Art

A conventional external force measuring apparatus for detecting a rotational angle generally detects a rotational angle of an object by integrating angular velocity signals of the object. Since the external force detecting means employs an angular velocity sensor, low-frequency noises such as random noises and drift noises are superimposed on the detection signals issued from the angular velocity sensor. Hence, there are various methods whereby to extract only signal components and integrate them in order to remove such noises.

For example, Japanese Laid-open Patent Publication No. 4-269622 discloses a tuning fork type vibration gyroscope for detecting a displacement angle. The vibration gyroscope comprises a detector and two drift detectors having the same configuration as that of the detector without a tuning fork. Drifts of the detector can be eliminated by subtracting the mean value of output signals of the two drift detectors from the output signal of the detector since drift components are superimposed on the output signals of the two drift detectors in the same way as that of the detector.

In recent years, a method for canceling random noises or drift noises by combining an angular velocity sensor with other angle detecting elements has been proposed, for example, in Japanese Laid-open Patent Publication No. 5-71964. In this publication, an angular velocity sensor and a geomagnetism sensor are employed to accurately calculate an azimuth. In this method, the angular signal obtained by integrating the signal of the angular velocity sensor is subtracted from the angular signal obtained from the geomagnetism sensor thereby to remove disturbance components contained in the signal issued from the geomagnetism sensor so as to determine accurate azimuth.

Further, Japanese Laid-open Patent Publication No. 3-188317 has proposed a method for calculating of angles with high accuracy by estimating drifts which fluctuate in probability mode using a nonlinear filter such as a Kalman filter. In this publication, the outputs from the angular velocity sensor and the geomagnetism sensor are read in and the current angle is calculated from these values and a past estimated angle. At this time, the detection signal from the angular velocity sensor is determined with high reliability by including an offset deviation. The Kalman filter theory is employed for this purpose. According to the Kalman filter theory, noise components can be effectively removed by performing arithmetic operation on the outputs of a three-axis angular velocity sensor by using the Kalman filter.

Among the conventional arts described above, however, the one in which a plurality of sensors are combined has a shortcoming in that the use of a plurality of sensors inevitably results in a complicated configuration of the apparatus, adding to the cost.

On the other hand, estimating a true detection signal from a detection signal by the Kalman filter requires an enormous amount of calculation; hence, it is necessary to employ a high-performance digital signal processor (DSP), a Reduced Instruction Set Computer (RISC) processor, or the like to process the detection signals from the sensors in real time, presenting a disadvantage of higher cost.

As an apparatus which overcomes the shortcomings described above, there has been known an offset drift correcting apparatus as disclosed in Japanese Laid-open Patent Publication No. 7-324941.

The offset drift correcting apparatus according to the art is constituted by: an angular velocity sensor for detecting angular velocity of a mobile unit; a turn determining means for determining whether the mobile unit is turning; and an adaptive filter which estimates the offset of the angular velocity sensor by using an average angular velocity obtained by smoothing corrective angular velocities and makes corrections if it is determined by the turn determining means that the mobile unit is not turning.

In the offset drift correcting apparatus, the difference between the output of the angular velocity sensor and the output from the adaptive filter estimated at that time provides the error amount of the estimated value. The value is averaged and is updated using the adaptive filter only when it is determined that the object is not turning. Thus, after a sufficient time elapses, the offset level of the angular velocity sensor settles to the output from the adaptive filter. The corrected angular velocity obtained by subtracting the estimated offset level from the angular velocity sensor is therefore processed as an accurate angular velocity so as to prevent the detection signal from being subjected to temperature drift, allowing drift components to be canceled.

In the offset drift correcting apparatus in accordance with the prior art described above, the output from the adaptive filter is always set at a value lower than the detection signals output from the angular velocity sensor thereby to enable the removal of drift components from detection signals.

However, the conventional art, poses a new problem in that, even if the turn determining means determines that the mobile unit is not turning, the difference between the detection signal and the output of the adaptive filter cannot be offset to zero, making it impossible to achieve reliable offset adjustment.

Accordingly, the present invention has been made in view of the problems with the prior art described above, and it is an object thereof to provide an external force measuring apparatus capable of removing drift components, random noises and the like in detection signals by simple processing.

SUMMARY OF THE INVENTION

An external force measuring apparatus in accordance with the present invention comprises external force detecting means, signal value reading means, external force action determining means, zero signal value updating and setting means, subtracted value determining means and subtracted value zero setting means. The external force detecting means detects, as a detection signal, the external force applied to an object to be measured.

According to the configuration described above, the detection signal issued from the external force detecting means is issued as an analog signal, and the signal value reading means reads in the analog detection signals at predetermined time intervals so as to read them in as intermittent read signal values. On the other hand, the external force action determining means compares a subtracted value obtained by subtracting a zero signal value, which has been established when no external force is being applied, from the read signal value supplied by the signal value reading means, with the first threshold value, and if the subtracted value is found to be smaller than the first threshold value, then the zero signal value updating and setting means updates and sets the foregoing read signal value as a new zero signal value.

Further, the subtracted value determining means compares the subtracted value obtained by subtracting a current zero signal, which has not been updated and set, from the read signal value or the subtracted value obtained by subtracting the new signal, which has been updated by the zero signal value updating and setting means, from the read signal value, with the preset second threshold value, and if the subtracted value is found to be smaller than the second threshold value, then the subtracted value zero setting means sets the subtracted value to zero.

The external measuring apparatus may further including integrating means. The integrating means integrates the external forces applied to the object to be measured according to the subtracted value regardless of whether the subtracted value has been set to zero or not by the subtracted value zero setting means. This makes it possible to prevent the diffusion due to the drifts in the read signal values output from the external force detecting means and to set the subtracted value to zero when no external force is being applied to the external force detecting means, thus enabling the subtracted values calculated by the integrating means to be output as measurement signals which use zero as the reference thereof.

For the purpose of illustrating the invention, there is shown in the drawings several forms which are presently preferred, it being understood, however, that the invention is not limited to the precise arrangements and instrumentalities shown.

BRIEF DESCRIPTION OF THE DRAWINGS

FIGS. 3A to 3D show the waveforms illustrative of a read signal value, a zero signal value, a subtracted value, and a measurement signal value output from an angular velocity detector, respectively.

DETAILED DESCRIPTION OF PREFERRED EMBODIMENTS

Figure 1:
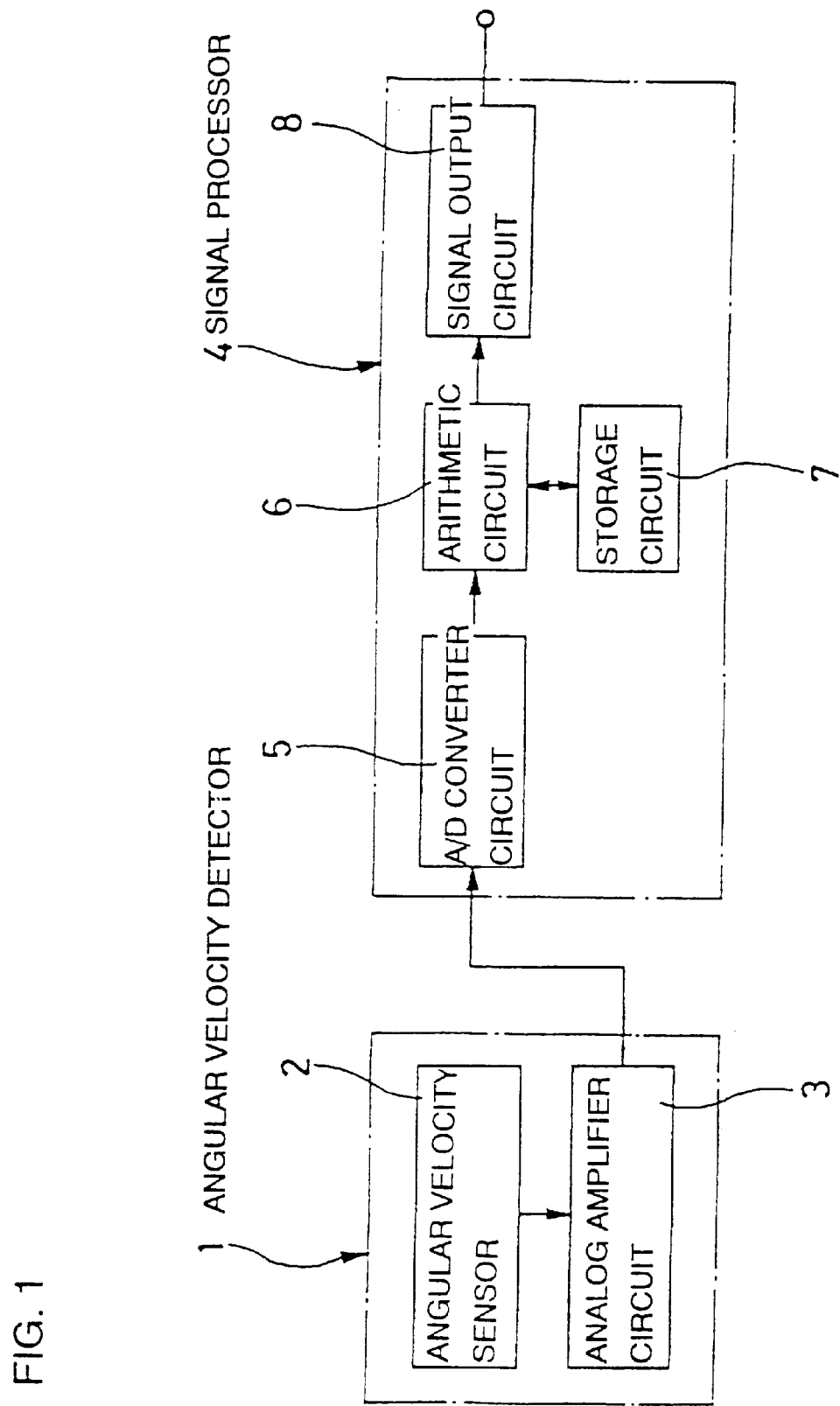
FIG. 1 is a block diagram of an angular velocity detecting apparatus according to an embodiment of the present invention.

Hereinafter, the preferred embodiments of the present invention are explained in detail with reference to the drawings. An angular velocity measuring apparatus will be explained as an example of the external force measuring apparatus.

In the drawing, reference numeral 1 denotes an angular velocity detector serving as the external force detecting means according to the embodiment. The angular velocity detector 1 is provided on a mobile unit (not shown), which is an object to be measured. The angular velocity detector 1 is constituted primarily by an angular velocity sensor 2 composed of a gyroscope sensor or the like for detecting angular velocity by using Coriolis force and an analog amplifier circuit 3 connected to the output of the angular velocity sensor 2. The analog amplifier circuit 3 outputs a detection signal (analog signal) corresponding to a change caused by the angular velocity around a predetermined axis applied to the angular velocity sensor 2 to a signal processor 4.

The signal processor 4 is constituted by, for example, a microcomputer or the like. The signal processor 4 comprises an A/D converting circuit 5, an arithmetic circuit 6, a storage circuit 7 and a signal output circuit 8. The A/D converting circuit 5 reads in the analog detection signal output from the analog amplifier circuit 3 at predetermined time intervals and converts the analog signals to digital signals. The arithmetic circuit 6 is provided in the stage following the A/D converting circuit 5 and calculates the angular velocity corrected by the processing which will be discussed later. The storage circuit 7 is connected to the arithmetic circuit 6 to exchange information with the arithmetic circuit 6 and stores a first threshold value $\Delta V1$, a second threshold value $\Delta V2$, a zero signal value V0 at the initial stage, and the processing program shown in FIG. 2, etc., which will be discussed later. The signal output circuit 8 is provided at the stage following the arithmetic circuit 6 and output measurement signals to a subsequent circuit. It is noted that the storage circuit 7 stores a preset zero signal value V0 obtained when no external force is being applied to the angular velocity detector 1 in advance before the apparatus is actuated, and, after actuation, 7 stores a zero signal value V0 which has been set by the previous processing.

The foregoing signal output circuit 8 is composed of a digital interface and connected to an external device (not shown) or the like by a predetermined format (e.g. RS-232C).

Figure 2:
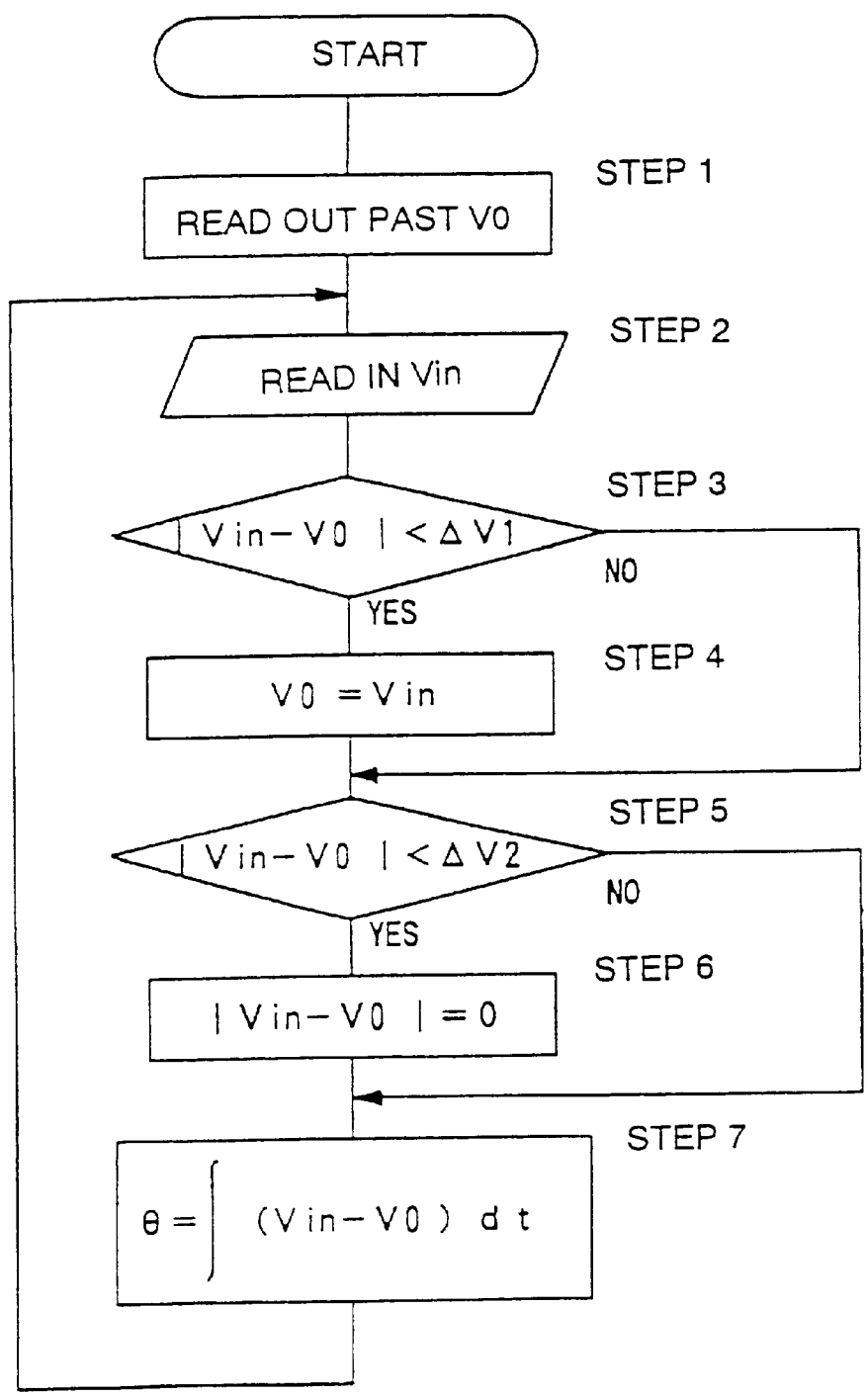
FIG. 2 is a flowchart illustrative of the signal processing in accordance with the embodiment.

The processing operation of the embodiment at the arithmetic circuit 6 will now be described in conjunction with the processing program of FIG. 2.

First, in step 1, the zero signal value V0 at the initial stage is read out from the storage circuit 7. It is noted that the zero signal value V0 obtained before the program is first executed is a signal value V0 which has been preset as a backup value. When the angular velocity measuring apparatus has already been used, the zero signal value V0 which has been set by the previous signal processing becomes the zero signal value V0.

Next, in step 2, the detection signals output from the angular velocity detector 1 at predetermined time intervals (e.g. 20 mS) and converted at the A/D converting circuit 5 are read in as the read signal value having a signal value Vin (hereinafter referred to as "read signal value Vin").

In step 3, the zero signal value V0 at the initial stage is subtracted from the read signal value Vin which has been read to determine whether an angular velocity is being applied to the mobile unit, and the subtracted value (Vin−V0) is compared with the preset first threshold value $\Delta V1$. If the absolute value of the subtracted value (Vin−V0) is smaller than the preset first threshold value $\Delta V1$, the determination result becomes "YES" in step 3. Then, the program decides that no angular velocity is being applied to the mobile unit and proceeds to step 4 to update the zero signal value V0. If the absolute value of the subtracted value (Vin−V0) is equal to or greater than the preset first threshold value $\Delta V1$, the determination result becomes "NO". Then, the program does not carry out updating and it proceeds to step 5 with the current zero signal value V0 unchanged.

In step 4, the read signal value Vin is updated and set to the zero signal value V0 which is then stored in the storage circuit 7. The zero signal value V0 is the value obtained by canceling the drift component in the read signal value Vin.

Further, in step 5, the current (initial) zero signal value V0 or the new zero signal value V0 updated in step 4 is subtracted from the read signal value Vi, which has been read, in order to determine again whether the angular velocity applied to the mobile unit can be regarded substantially as a zero value, i.e. whether the subtracted value should be set to the zero value. Then, in step 5, the subtracted value (Vin−V0) is compared with the preset second threshold value ΔV2.

If the absolute value of the subtracted value (Vin−V0) is smaller than the preset first threshold value ΔV2, the determination result in step 5 becomes "YES". Then, the program goes to step 6 wherein the subtracted value (Vin−V0) is set at zero because the subtracted value is in the range where it is recognized substantially as a zero value. The program then proceeds to step 7.

If the absolute value of the subtracted value (Vin−V0) is equal to or greater than the preset first threshold value ΔV2, the determination result in step 5 becomes "NO", and the program goes to step 7.

In step 7, the subtracted value (Vin−V0) is integrated to acquire a measurement signal which provides a displacement angle κ regardless of whether the subtracted value (Vin−V0) is greater than the second threshold value ΔV2 and the determination result in step 5 has been "NO" or whether (Vin−V0)=0 has been set in step 6.

In the arithmetic operation in step 7, the integration processing is performed even when the subtracted value (Vin−V0) is zero due to the fact that the subtracted value (Vin−V0) is smaller than the second threshold value ΔV2 in step 6. In this case, the subtracted value (Vin−V0) is regarded as a value resulting from the removal of the drift component and the noise component from the read signal value Vin, thereby obtaining the result that the displacement angle θ is zero. For this reason, the displacement angle θ obtained by the arithmetic operation in step 7 can be provided as the measurement signal value resulting from correcting those error components such as noise components and drift components.

It is noted that the first threshold value ΔV1 is set so as to be slightly larger than the amplitude of the random noise contained in the detection signal issued from the angular velocity detector 1, while the second threshold value ΔV2 is set so as to be slightly larger than the change rate of the detection signal issued from the angular velocity detector 1 during rest.

In conjunction with the waveform diagrams of FIGS. 3A to 3D, the specific operation of the angular velocity measuring apparatus according to the embodiment will now be described in relation to the processing of FIG. 2.

FIG. 3A shows the read signal value Vin supplied from the angular velocity detector 1 to the signal processor 4. FIGS. 3B and 3C respectively show the zero signal value V0 and the subtracted value (Vin−V0) which has the drift component removed before integration. FIG. 3D shows the measurement signal value (displacement angle θ).

A drift signal D is superimposed on the read signal value Vin due to temperature changes, time-dependent deterioration, etc. Hence, the drift signal D is indicated as the gradient in the waveform (see FIG. 3A).

If the subtracted value (Vin−V0) has been found to be smaller than the first threshold value ΔV1, i.e. in the zones a, a, after the aforesaid processing of steps 3 and 4, then the most up-to-date Vin at that point is set as the new zero signal value V0 by performing the arithmetic operation of step 4. If the subtracted value (Vin−V0) has been found to be larger than the first threshold value ΔV1, then the updating of the zero signal value V0 is disabled and the current zero signal value V0 is maintained (see FIG. 3B).

If the subtracted value (Vin−V0) has been found to be smaller than the second threshold value ΔV2 after the aforesaid processing of steps 5 and 6, then it is decided that no angular velocity is being applied to the angular velocity detector 1, and the subtracted value (Vin−V0) is set at zero (see FIG. 3C). This setting enables the random noise component to be eliminated from the signal.

Thus, the signal (subtracted value) which is free of the drift component and the random noise component contained in the read signal value Vin can be obtained. Integrating the obtained signal in step 7 permits an accurate displacement angle θ to be detected (see FIG. 3D).

Furthermore, in this processing, the zero signal value V0 is updated and set according to the low-frequency fluctuation of the read signal value Vin, so that noises containing low-frequency components such as drift components can be effectively removed.

Further, in the processing of step 5, if the subtracted value (Vin−V0) lies in a range regarded as zero, the offset is carried out to remove the noise component. Therefore, it is possible for the subtracted value (Vin−V0) to have the waveform using zero as the reference thereof as illustrated by FIG. 3C.

In addition, the subtracted value (Vin−V0) to be integrated in step 7 is adjusted to be offset with respect to the zero signal value V0 which includes no drift component by the steps 3 and 4. Therefore, the noise component can be securely removed from the read signal value Vin, thus enabling the accurate measurement signal value (displacement angle θ) to be obtained as shown in FIG. 3D.

As explained above, in the angular velocity measuring apparatus according to the embodiment, the zero signal value V0 is updated and set to a new value if it is determined that no angular velocity is being applied to the angular velocity detector 1 from the subtracted value based on the read signal value Vin and the zero signal value V0, thereby making it possible to set the zero signal value V0 canceling the drift component in the read signal value Vin.

Moreover, repeatedly, noise in the read signal value Vin is offset by the subtracted value obtained by subtracting the current zero signal value V0 from the read signal value Vin or the subtracted value obtained by subtracting the updated and set zero signal value V0 from the read signal value Vin. Hence, the subtracted value can be output as the signal using zero as the reference thereof, and both drift component and random noise component in the read signal value Vin can be eliminated. Thus, by integrating the subtracted value corresponding to accurate angular velocity, the displacement angle θ of the mobile unit (object to be measured) can be output as a measurement signal value as indicated in FIG. 3D.

Furthermore, as previously described, the embodiment makes it possible to remove the drift component from the read signal value Vin and to securely set the zero signal value; therefore, the read signal value Vin can be securely set to zero when no angular velocity is being applied to the angular velocity detector 1, thus permitting accurate angular velocity detection compared with the offset drift correcting apparatus in accordance with the prior art.

In the embodiment described above, step 2 in FIG. 2 is a specific example of the signal value reading means, step 3 is a specific example of the external force action determining means, and step 4 is a specific example of the zero signal value updating and setting means; further, step 5 is a specific example of the subtracted value determining means, step 6 is a specific example of the subtracted value zero setting means, and step 7 is a specific example of the integrating means.

In the aforesaid embodiment, the description has been made of an illustrated embodiment that employs the angular velocity detector 1 for detecting angular velocity as the external force detecting means. However, the present invention is not limited thereto, and it may be alternatively applied to one that employs an acceleration sensor for detecting acceleration. In this case, the integration may be implemented twice to detect the displacement angle. Further alternatively, a velocity sensor may be employed for the external force detecting means and the read signal value is integrated once to detect the displacement position, or various external forces may be detected and only the required amount may be detected.

In addition, although the external force measuring apparatus in the embodiment performs step 7 for obtaining an accurate displacement angle Θ, step 7 may be performed by a device other than the external force measuring apparatus. That is, the external force measuring apparatus may include no integrating means and output accurate angular velocity signals which have no random noises and drift noises. An appropriate device connected to the external force measuring apparatus then integrates the angular velocity signals to obtain an accurate displacement angle Θ from the accurate angular velocity signals, whereby the device utilizes both the accurate angular velocity and displacement angle Θ.

In the embodiment described above, the detection signal is read in at predetermined time intervals (e.g. 20 mS) in step 2; however, the present invention is not limited thereto. The read-in timing may be changed to, for example, 10 mS, 20 mS, 30 mS, and so on. In this case, if the detection signal changes quickly, then the read-in timing may be set shorter, or if it changes slowly, then the read-in timing may be set longer.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An external force measuring apparatus, comprising:
   external force detecting means for detecting, as a detection signal, the external force applied to an object to be measured;
   signal value reading means for reading in the detection signal received from said external force detecting means at predetermined time intervals and for outputting it as a read signal value;
   external force action determining means for determining whether an external force is being applied to said external force detecting means by comparing a subtracted value obtained by subtracting a zero signal value, which is established when no external force is being applied, from the read signal value supplied by said signal value reading means, with a preset first threshold value;
   zero signal value updating and setting means for updating and setting said read signal value as a new zero signal value if it has been determined by said external force action determining means that no external force is being applied to said external force detecting means;
   subtracted value determining means for comparing a subtracted value obtained by subtracting a zero signal value, which has been updated and set or which has not been updated and set by said zero signal value updating and setting means, from the read signal value supplied by said signal value reading means, with a preset second threshold value so as to determine whether said subtracted value is smaller than said second threshold value; and
   subtracted value zero setting means for setting said subtracted value to zero if said subtracted value determining means has determined that said subtracted value is smaller than said second threshold value.

2. An external force measuring apparatus according to claim 1, further comprising integrating means for integrating the substrate value obtained by subtracting the zero signal value from said read signal value regardless of whether the subtracted value has been set to zero or not by said subtracted value zero setting means.

3. External force measuring apparatus, comprising:
   an angular velocitor detector for outputting a signal having a value representative of an angular velocity value;
   first means for comparing a first difference between the value of said signal and a preset value to a first predetermined threshold value;
   means for changing the value of said preset value to a value equal to the value of said signal if the first comparing means indicates that the first difference is less than said first threshold value;
   second means, operative if the first comparing means indicates that the first difference is greater than said first threshold value, for comparing a second difference between the value of said signal and said preset value to a second threshold value; and
   means for changing the value of said preset value to zero if the second comparing means indicates that the second difference is less than said second threshold value.

4. External force measuring apparatus according to claim 3, further comprising means for integrating the second difference regardless of whether the second difference is equal to, greater than, or less than said second threshold value.

5. External force measuring apparatus, comprising:
   an angular velocity detector for outputting a signal having a value representative of an angular velocity; and
   a signal processor for (1) comparing a first difference between the value of said signal and a preset value to a first predetermined threshold value, (ii) changing the value of said preset value to a value equal to the value of said signal if the first comparing means indicates that the first difference is less than said first threshold value, (iii) comparing a second difference between the value of said signal and said preset value to a second threshold value, and (iv) changing the value of said preset value to zero if the second difference is less than said second threshold value.

6. External force measuring apparatus according to claim 5, wherein the signal processor further integrate the second difference regardless of whether the second difference is equal to, greater than, or less than said second threshold value.

7. External force measuring apparatus according to claim 5, wherein said signal processor comprises an arithmetic circuit, a storage circuit connected to the arithmetic circuit and a signal output circuit connected to the arithmetic circuit.

8. External force measuring apparatus according to claim 7, wherein the signal output from the angular velocity detector is an analog signal and the signal processor includes an analog-to-digital converter for converting said analog signal to a digital and applying said digital signal to said arithmetic circuit.

* * * * *